United States Patent [19]

Colgate, Jr.

[11] Patent Number: 4,462,851

[45] Date of Patent: Jul. 31, 1984

[54] METHOD FOR TAXING CIGARETTE PACKS AND VALIDATING CIGARETTE CARTONS

[75] Inventor: Gilbert Colgate, Jr., New York, N.Y.

[73] Assignee: United States Banknote Corporation, New York, N.Y.

[21] Appl. No.: 434,830

[22] Filed: Oct. 18, 1982

[51] Int. Cl.$^{3}$ ........................ B65B 6/00; B29C 17/04; B32C 31/00; B32B 3/04

[52] U.S. Cl. .................................... 156/212; 156/221; 156/277; 156/479; 156/DIG. 4; 428/916; 53/137

[58] Field of Search .................. 53/134, 137; 428/915, 428/914, 84, 200, 346, 347, 40, 42, 41; 131/106; 283/81, 79, 101, 70, 106, 21, 22; 156/DIG. 12, DIG. 2, DIG. 4, DIG. 36, 212, 299, 249, 300, 277, 240

[56] References Cited

U.S. PATENT DOCUMENTS

| | | | |
|---|---|---|---|
| 2,961,717 | 11/1960 | Morin | 156/221 |
| 2,988,834 | 6/1961 | Brownlee | 283/79 |
| 3,841,936 | 10/1974 | Fergg et al. | 156/277 |
| 4,032,386 | 6/1977 | Fleet | 156/475 |
| 4,059,477 | 11/1977 | Wesley | 156/212 |
| 4,160,687 | 7/1979 | Spear | 156/479 |
| 4,181,561 | 1/1980 | Seragnoli | 156/DIG. 14 |
| 4,184,305 | 1/1980 | Baker et al. | 53/137 |
| 4,326,907 | 4/1982 | Bornefeld et al. | 283/81 |

*Primary Examiner*—Edward C. Kimlin

*Assistant Examiner*—Louis Falasco

*Attorney, Agent, or Firm*—Cushman, Darby & Cushman

[57] ABSTRACT

A method for placing tax stamps onto the bottoms of cigarette packs contained in a carton includes the steps of selecting a sheet of tax stamps having at least two rows and five columns thereby defining individual tax stamp units bearing tax indicia thereon, separating each of the units while simultaneously maintaining the spatial integrity of the columns and rows, transferring the units onto the cigarette packs contained in the carton, and affixing each of the units to the cigarette packs thereby establishing that the cigarette packs have been taxed by the proper taxing authority.

11 Claims, 10 Drawing Figures

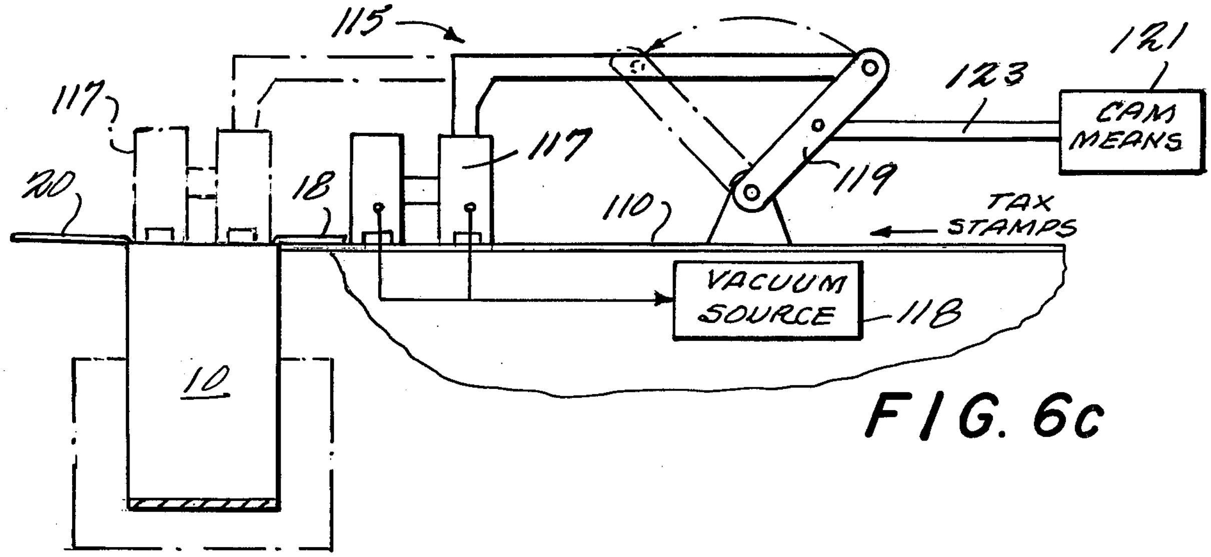
FIG. 6c
FIG. 7
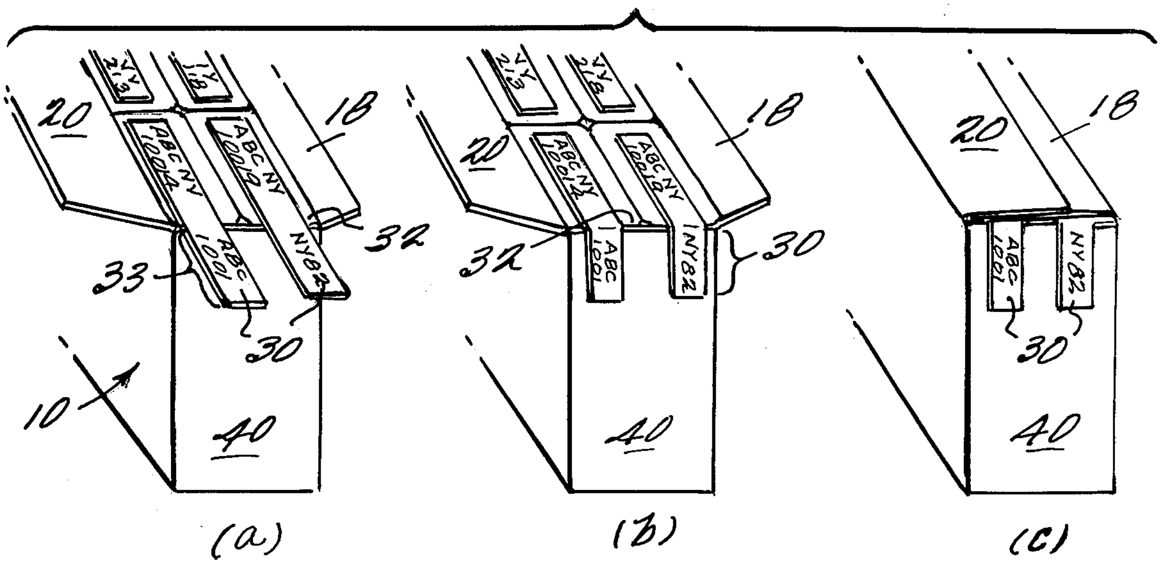
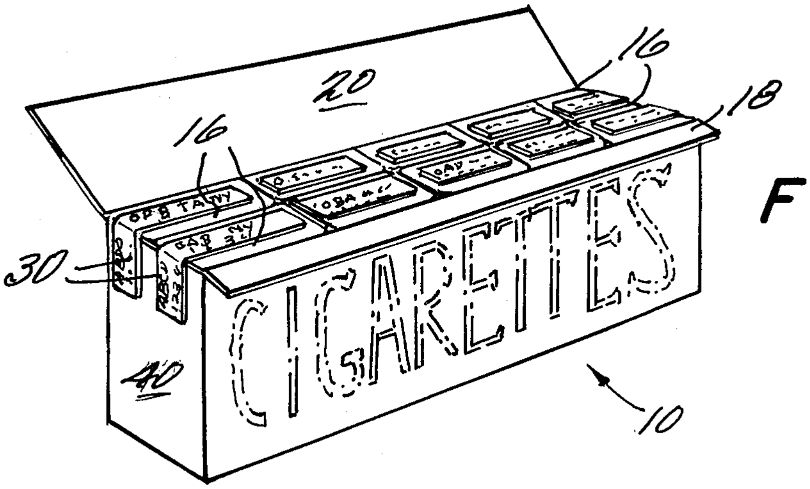
FIG. 8

METHOD FOR TAXING CIGARETTE PACKS AND VALIDATING CIGARETTE CARTONS

BACKGROUND AND SUMMARY OF THE INVENTION

The present invention relates to a method of placing tax stamps on individual packs of cigarettes housed in a cigarette carton. More particularly, the present invention relates to a method for not only placing numbered and coded tax stamps on each pack of cigarettes in a cigarette carton, but also a system whereby the cartons themselves can be easily validated and inspected as to whether they contain taxed cigarette packs without the cartons being opened. Additionally, the present invention provides the taxing authorities with a heretofore unavailable audit trail. Accordingly, the present invention provides a novel and unique method for placing tax stamps upon individual packs of cigarettes contained in a carton so as to deter cigarette smuggling and the production of counterfeit tax stamps.

According to recent estimates, the sale of cigarettes by the carton (as opposed to individual cigarette packs) amounts to approximately 65% of the total cigarette sales in this country. The individual cigarettes are first manufactured, enclosed into packs of twenty cigarettes per pack and, thereafter, ten packs are placed into a carton in two even rows of five. The carton comprises top and bottom flaps which are lightly spot-glued in two places and, according to conventional practices, sixty cartons are thereafter placed into a cardboard shipping case. The manufacturer presently pays an eight cent per pack federal excise tax. This federal excise tax is determined upon the weight of tobacco, and cross-checked with invoices for accuracy. It is not, however, based upon tax stamps or any other inventoried tax indicia.

From the point of manufacture, the cigarettes are shipped to regional warehouses. Individual wholesalers, authorized by their respective states to affix tax indicia, and authorized by the tobacco companies to "buy direct" then draw directly from these regional warehouses. There are, of course, certain exceptions such as ship stores, export and overseas military PX cigarettes which are shipped in bond from the manufacturer to a port of embarkation. It should be particularly noted that when the cigarettes arrive at the regional warehouses from the manufacturer, the individual packs of cigarettes do not reflect any state or municipal tax indicia.

From the regional warehouses, the cigarettes are transferred to wholesale stamping agents. The stamping agents take title to the cigarettes, affix the tax stamp which they have purchased from the appropriate finance or revenue department of the appropriate state, and resell the taxed cigarettes to sub-distributors, such as vending machine owners, stores and the like. If cigarette cartons are stolen and distributed prior to receiving the tax stamps, a significant reduction in price could be effected by virtue of the cigarettes not bearing a valid tax stamp since the thief would not have paid the appropriate tax thereon. Accordingly, there is, in the case of cigarettes, an incentive for counterfeiting tax stamps, or smuggling untaxed or low taxed cigarettes into a jurisdiction whereby they are sold at a greatly reduced cost and at a substantial profit to the illegal smuggler and/or counterfeiter whose costs are less than those of legitimate retailers who sell cartons on which the appropriate tax has been paid. Presently, this difference can be as much as $2.20 per carton. This is especially true since the effective demise of the Federal Bureau of Alcohol, Tobacco and Firearms (which had interstate enforcement powers) which means there now exists greater temptation and incentive, resulting in a higher incidence of hijacking and interstate smuggling.

Different states, of course, operate the collection of their tax revenues on cigarettes in different manners. For example, in the states of Michigan and Hawaii, no tax indicia presently appears on the cigarette packs as the tax is collected from the wholesaler based upon bills of lading, invoices or other records. Some states use a decal system for tax accounting purposes. This system is typically called the "decalcomania method". According to this prior method, a decal is essentially silk-screened onto clear plastic which is transferred to the bottom of the cigarette pack either by heat or by water. However, decals can be counterfeited rather easily and therefore their purpose as an accounting method for cigarette taxes can and has been circumvented.

A third method of tax accounting presently in use is a metering machine manufactured by Pitney Bowes. The Pitney Bowes machine offers the taxing authorities a distinct advantage since there are very small usage costs. The machines, much like postage meters, place indicia in the form of ink directly upon the cigarette packs. Accordingly, the only product cost of the indicia itself is the cost of the ink which is minimal. This conventional method is extremely easy to counterfeit.

According to the present invention, a method is provided which is superior to such prior methods and, moreover, enables not only the individual cigarette packs to have tax stamps placed thereon, but also provides a means by which the carton itself can be visually inspected so as to determine at a glance whether the packs therein have been taxed without resort to opening the cartons. Accordingly, the present invention offers a distinct advantage wherein tax inspectors can visually determine whether the individual packs in a given container have properly taxed cigarette packs therein.

A second unique and major advantage of the present invention, in addition to other attributes which will become clear after detailed consideration is given to the disclosure herein, will be that the tax stamps can be computer imprinted so that each pack and carton of cigarettes will contain certain unique information e.g. serial number, date, wholesaler's name or code, etc. Thus, for the first time, the taxing authority can have a complete audit trail.

Basically, there are two methods for printing the actual stamps. The unique method of intaglio may be utilized to provide a secure document or, in a preferred mode, the use of proprietary inks may be utilized which, when touched with predetermined chemical reagents, react by turning different colors. Both the intaglio and the special inks are, in and of themselves well known in the art. Each provides a far higher level of security than the methods currently being used.

One of the unique aspects of the present invention concerns the use of the printed tax stamps, whether printed by intaglio or lithography using proprietary inks or even at some future date without the anti-counterfeiting features which these provide, which are oriented on the web of paper so that they may be fed through a computer printer and each stamp be given a unique number and identification.

According to the present invention, either of the above methods may be advantageously utilized in conjunction therewith so as to provide the taxing inspector with a means of determining whether the cigarette cartons are legally taxed and whether the individual cigarettes packs in each carton have been legally taxed. Both of these determinations can be made without opening the carton itself.

According to the present invention, a sheet of tax stamps may be provided which, on one side, defines at least two rows and five columns thereby defining individual units, each of which bears tax indicia. On the other side of the sheet of tax stamps, there is preferably provided a heat sensitive adhesive for adhering the tax stamps to the individual packs of cigarettes.

The preferred method of covering the tax stamps with heat sensitive material is as follows. The raw paper out of which the stamp is created is coated at manufacture. The coating must be done in such a way as to make sure the adhesive, when applied, does not migrate through the paper and cause it to stick to itself when rolled or folded. The coated side of the paper receives ink better than the dull, more porous uncoated side. Therefore, virtually all adhesive coating on the commercial market is applied to the uncoated side of the paper allowing the paper to receive printing indicia more readily thereon. The preferred feature although not a limiting feature to the present invention, is to utilize paper for the tax stamps which has the adhesive coating applied to the "coated", protected side thereby providing a dull substrate which does not reflect light well and which permits ease of visibility to the practiced eye.

The units of tax stamps can then be separated two rows at a time and each of the columns can be separated without disturbing the spatial integrity of the columns and rows. Thereafter, the separated two rows and five columns of the tax stamps are transferred onto the bottom of the cigarette packs.

The appropriate tax indicia can be printed or otherwise provided by any suitable printing means. The most preferable, however, is to utilize a computer which serially generates identifying numerals for each pack of cigarettes. For example, when a computer is utilized, not only will each cigarette pack be serially identified by a unique number, but each carton of cigarettes can be supplied with a unique number and/or symbol which serves to identify the wholesale distributor who affixes the tax stamps. Moreover, the computer generation of unique numbers or symbols will permit an independent cross-check for the tax inspectors i.e. an accurate record of tax stamps purchased by wholesale distributors can be maintained to establish an "audit trail" for inspectors. Thus, it may be possible when utilizing the present invention to plant "trace" (e.g. specially marked) cartons of cigarettes in the distribution chain so as to establish the point at which such cartons illegally leave the chain. In such a manner, it may now be possible to accurately pinpoint potential geographical areas and/or distributors in which a high probability of cigarette tax fraud exists. Thus, by utilizing the present method, not only can illegal operators be more easily targeted, but once it is widely known that cigarette smuggling is a high risk crime, a certain deterrent to future crimes will be a beneficial corollary.

By taking advantage of the "audit trail" which the present invention encourages, an inspector can immediately determine a discrepancy in any jurisdiction e.g. New York City, as compared with one or more other jurisdictions, e.g. New York State or New Jersey. The name of the stamping agent, serial numbers or codes, etc., can alert the inspector to any cigarettes which are outside the normal channels of distribution. For example, assuming stamping Agent X does not normally sell in Brooklyn but normally sells in the Bronx, should any of Agent X's cigarettes be found in the Brooklyn retail market (e.g. in vending machines or stores), the inspector is automatically alerted to stolen cigarettes or other illegal activities in the area of stamping Agent X. This, of course, does not imply dishonesty or illegal activity on the part of stamping Agent X, but does indicate a starting point for investigators to determine the cause and perpetrators of such illegal activities. If Agent X had reported a theft, then the inspectors could confiscate the cigarettes so found in Brooklyn with certainty. No prior system can provide this certainty and ability to the inspectors.

An important feature of the present invention is the provision for each end unit of the two rows of tax stamps to have a portion which, when compared with the units intermediate to the end units, are a greater dimension in the longitudinal direction. Hereinafter, such portions will be identified as "carton validators" since, as will become more clear from the discussion below, such portions can enable tax inspectors to determine at a glance whether the carton contains properly taxed cigarette packs. The carton validators are adapted for being placed over the peripheral edge of the carton on each end thereof and for being securely adhered to the outside ends of the cigarette carton. In such a manner, should a tax inspector desire to determine whether the individual cigarette packs contain properly taxed cigarettes, he may make his inspection (e.g. either visually or with the use of special ink detectors applied to proprietary ink on the tax stamps) on the ends of the carton without opening the flaps thereof for a direct inspection. Accordingly, the present invention offers a much more rapid system for inspection purposes.

Thus, the present invention presents a deterrent to counterfeiting and smuggling of untaxed cigarettes since it will be more difficult for such smugglers to provide cigarette cartons with the exact tax indicia and proprietary ink necessary. Additionally, it will be much more difficult for cigarette smugglers to "hide" untaxed cigarettes behind properly taxed cigarettes out of the view of the inspector since the inspector can tell upon a quick glance whether the carton contains properly taxed cigarettes.

These and other advantages according to the present invention will become more apparent after detailed consideration is given to the description of the preferred exemplary embodiments thereof which follows.

BRIEF DESCRIPTION OF THE DRAWINGS

Reference will be herein made to the accompanying drawings wherein like numerals throughout the various figures denote like elements thereof, and wherein:

FIG. 6c is a schematic representation of a transfer apparatus useable with the cutting apparatus of FIG. 6b;

FIG. 7 is a progressive end view of cigarette cartons showing the various stages of application of the carton validators; and FIG. 8 is a detailed perspective view of a carton of cigarettes having tax stamps applied thereto in accordance with the present invention.

DETAILED DESCRIPTION OF THE PREFERRED EXEMPLARY EMBODIMENTS

Figure 1:
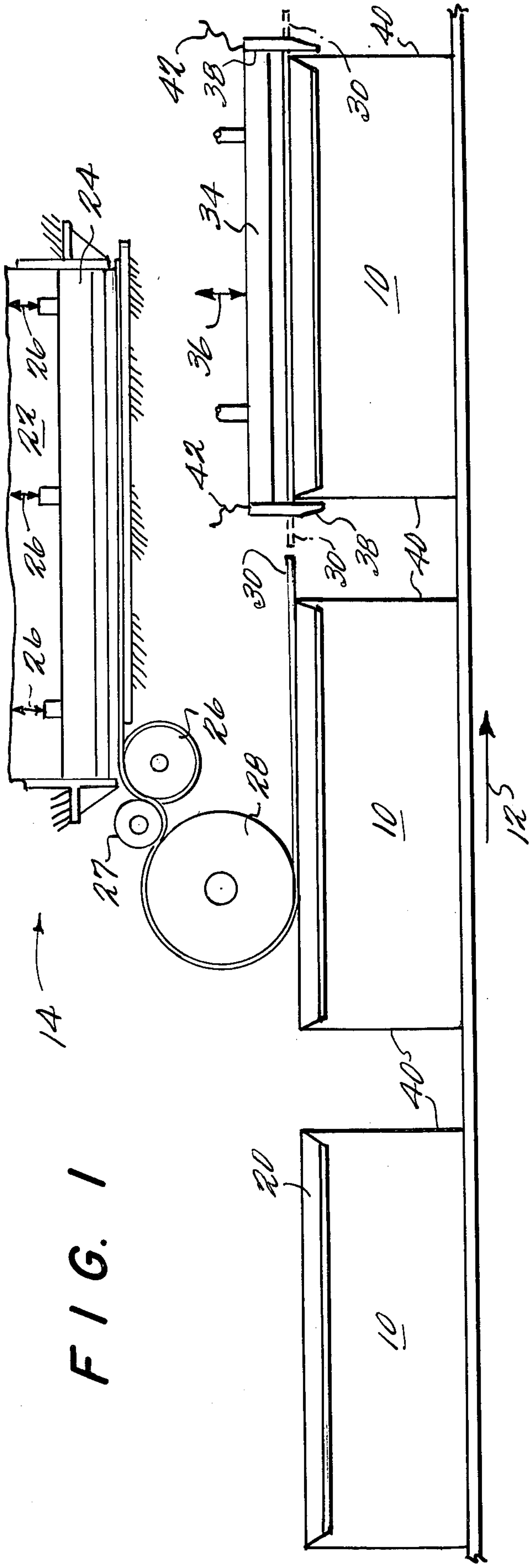
FIG. 1 is an elevational schematic representation of an apparatus for placing tax stamps on opened cartons of cigarettes in accordance with the present invention.
Figure 2:
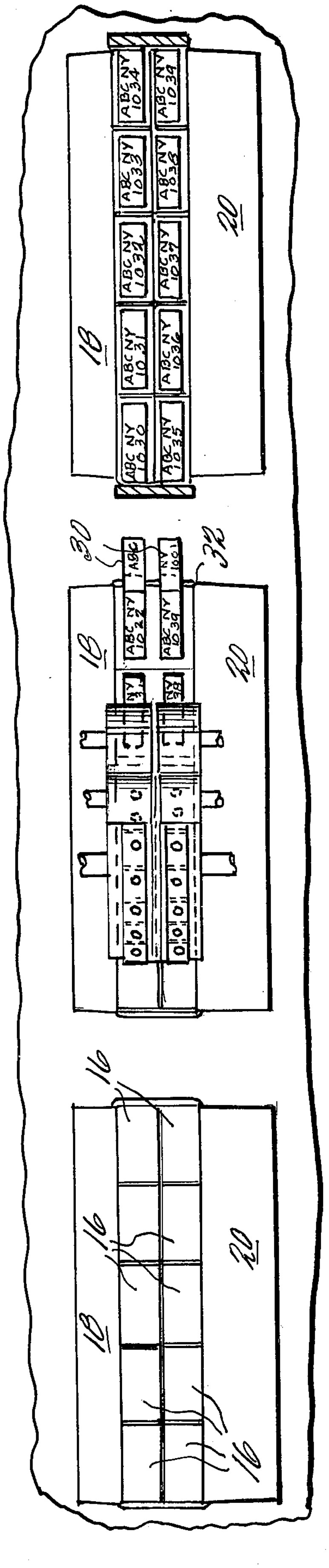
FIG. 2 is a plan view of the schematic representation of FIG. 1.

Referring to FIGS. 1 and 2, the present invention generally contemplates that cigarette cartons 10 can be conveyed in a predetermined direction (arrow 12) under an apparatus 14 which transfers the tax stamps in two rows, each row including five tax stamps, to the bottom of individual cigarette packs 16 housed in carton 10 (see FIG. 2). Each carton 10 of cigarettes includes bottom flaps 18, 20 which must be opened before the carton 10 is passed under an apparatus 14 for placing tax stamps thereon.

The cartons 10 of cigarettes are generally spot glued in two locations when they arrive from the manufacturer prior to having tax indicia placed on all individual cigarette packs 16 therein. Accordingly, flaps 18, 20 can be opened in any suitable manner. One preferred manner is by utilizing a blade or a "plow" beneath the bottom flaps so as to break the spot gluing thereon. The plows are designed so that as the cigarette carton is conveyed along a predetermined path, the bottom flaps are urged apart so as to expose the bottoms of individual cigarette packs 16 in carton 10. After the tax stamps have been applied to the individual cigarette packs 16, reverse plows are utilized so as to close the flaps of the cigarette cartons 10 and additional glue is placed thereon so that the carton is then ready for distribution to the market. Features such as the opening and closing plows have not been depicted in FIGS. 1 and 2 as these are well known in the appropriate art and comprise a well known portion of the Pitney Bowes, American Decal and Meyercord machines.

An apparatus 14 for accomplishing the method according to the present invention is depicted generally in FIGS. 1 and 2, and, thus, the method according to the present invention will be described concurrently with the following description of the apparatus. There are presently available various machines which are designed for applying computer-printed address labels for mass mailing purposes such as, for example the Cheshire 539 labeling head commercially available from Cheshire (a Xerox corporation) of Mundelein, Ill. and when modified can be utilized in practicing the present invention. Such an apparatus is depicted in FIGS. 1–5.

A sheet 22 having on one side a heat sensitive adhesive and on the other side tax stamps printed in a predetermined number of rows and five columns are automatically advanced under a cutting blade 24 which reciprocally operates (arrows 26) so as to cut or separate two rows from sheet 22 as it advances thereunder. The two rows after being separated from sheet 22 by cutting blade 24 are thereafter conveyed to cutting wheel 26 wherein the two rows are longitudinally separated from each other and transverse cuts are made so as to separate the five columns of each of the two rows thereby establishing ten discreet tax stamp units. Without destroying the spatial integrity of the rows and columns of the tax stamp units, conveyance is effected via idler roller 27 to vacuum pick-up wheel 28. Vacuum pick-up wheel (as will be described in more detail below) slightly separates each of the units longitudinally and transfers them in such a manner that each tax stamp unit will be placed upon a corresponding bottom of one of the cigarette packs 16 in sequential order.

As will be noted by referring to FIG. 1, a portion 30 of each opposing end unit extends beyond the peripheral edge 32 of carton 10. In such a manner, a heated bar 34 which is reciprocally operable (arrow 36) can be brought into contacting relationship with the tax stamp units placed on the bottoms of cigarette packs 16 by virtue of wheel 28. Heat bar 34 applies heat to the tax stamps and, therefore, the heat-sensitive adhesive interfacing each tax stamped unit and the bottoms of cigarettes packs 16 will effect secure adherence thereto. Additionally, heat bar 34 includes members 38 on either end thereof so as to force portions 30 to lie in a contacting relationship against ends 40 of carton 10. Heat energy can be supplied to bar 34 and members 38 by any conventional means such as electrical conductors 42 or the like.

Figure 3:
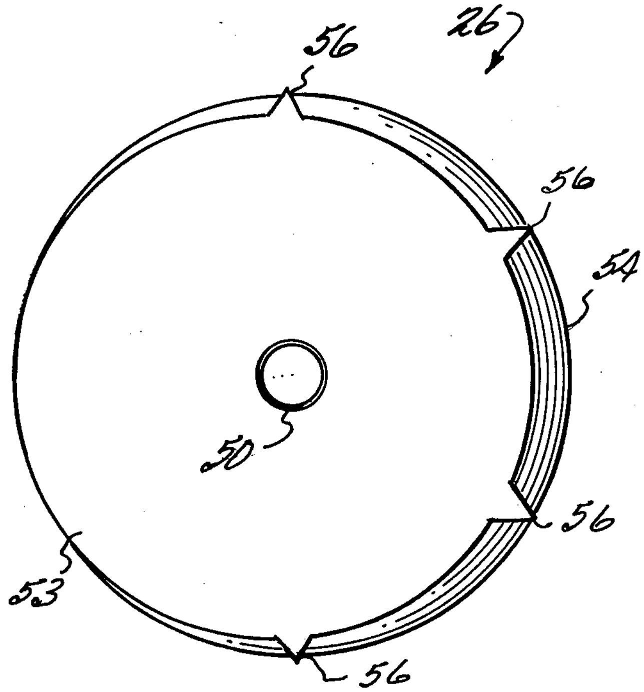
FIG. 3 is an elevational view of the cutting wheel utilized in the apparatus of FIG. 1.
Figure 4:
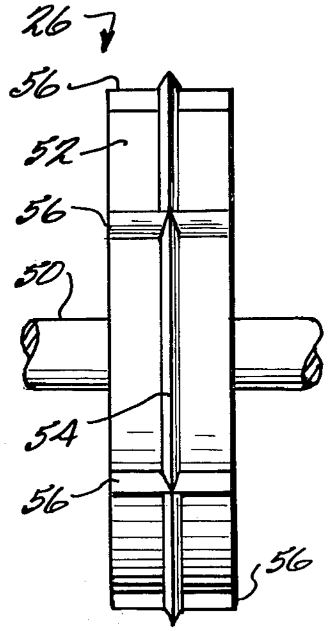
FIG. 4 is a side elevational view of the cutting wheel of FIG. 3.
Figure 5:
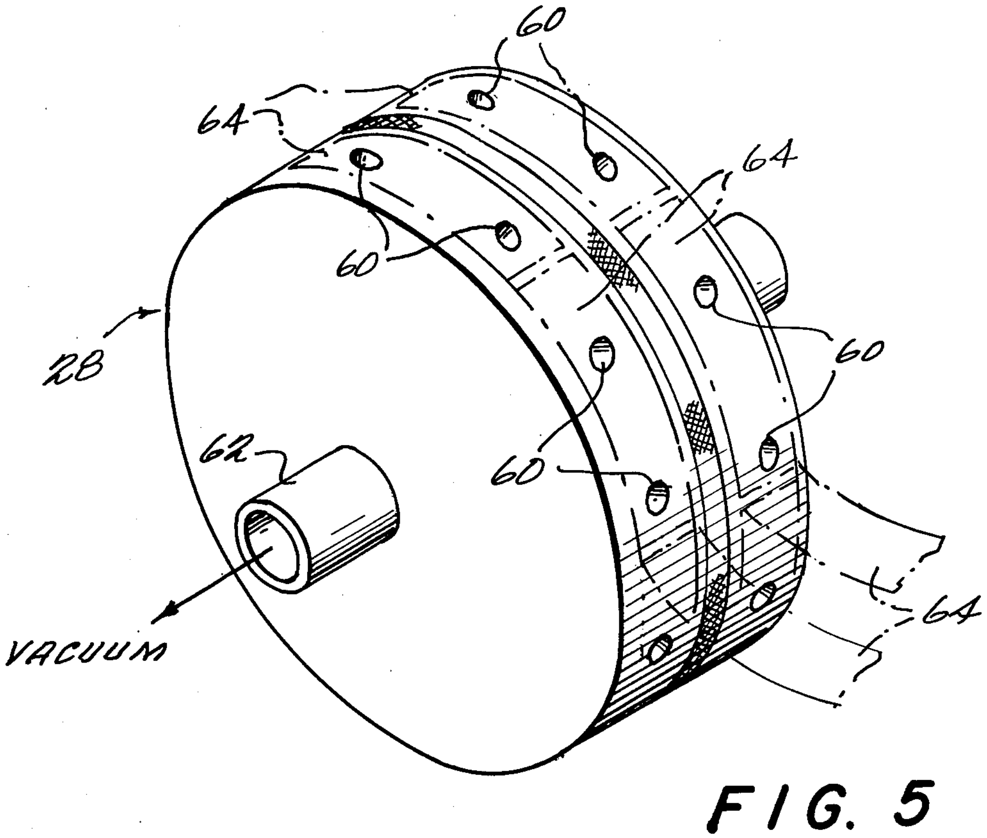
FIG. 5 is a perspective view of a vacuum wheel utilized according to the present invention to transfer the separated tax stamps to the cigarette packs without disturbing the spatial integrity of the two rows and five columns thereof.
Figure 6A:
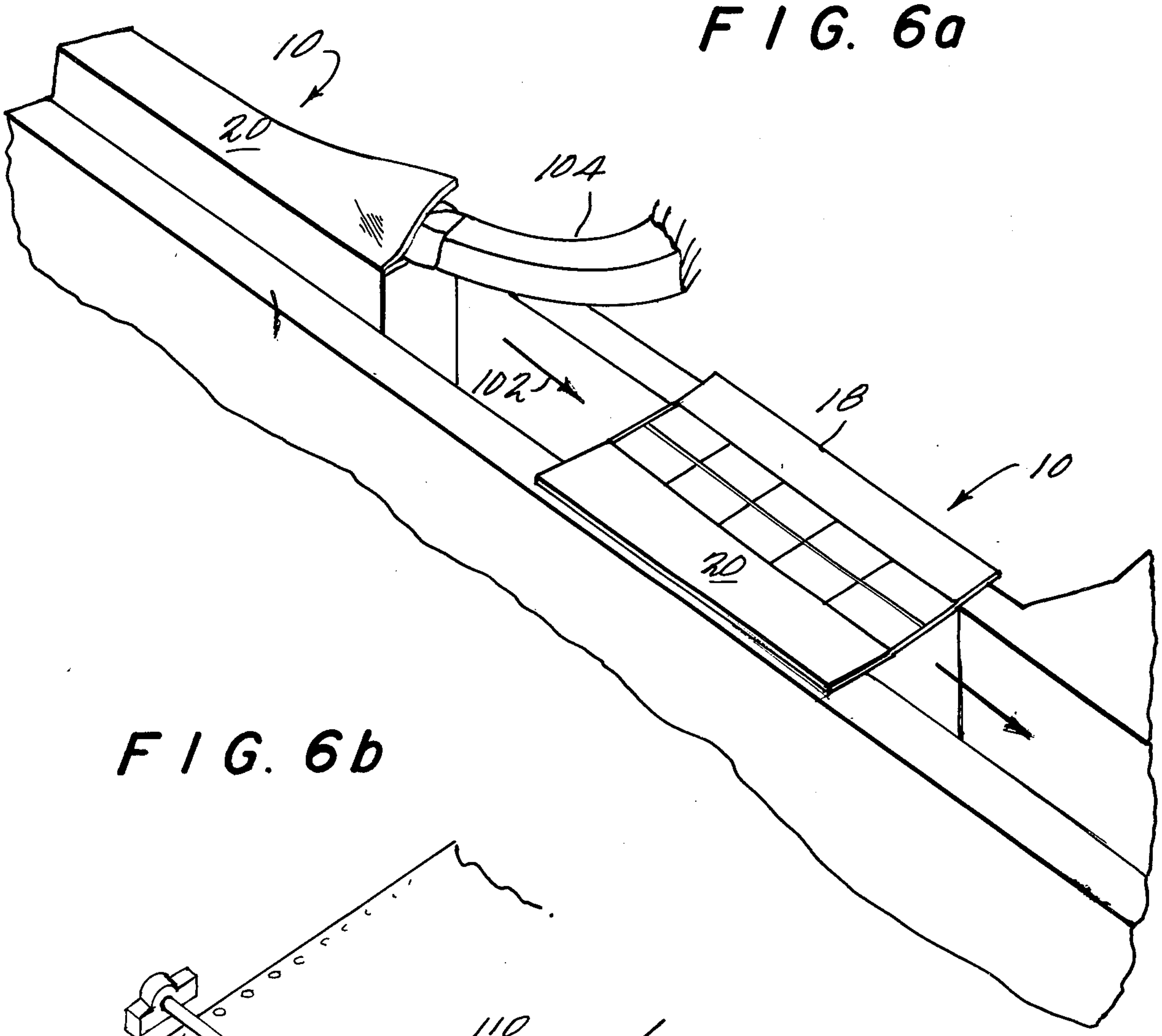
FIG. 6a is a schematic perspective view of a cigarette carton having its bottom flap opened.
Figure 6B:
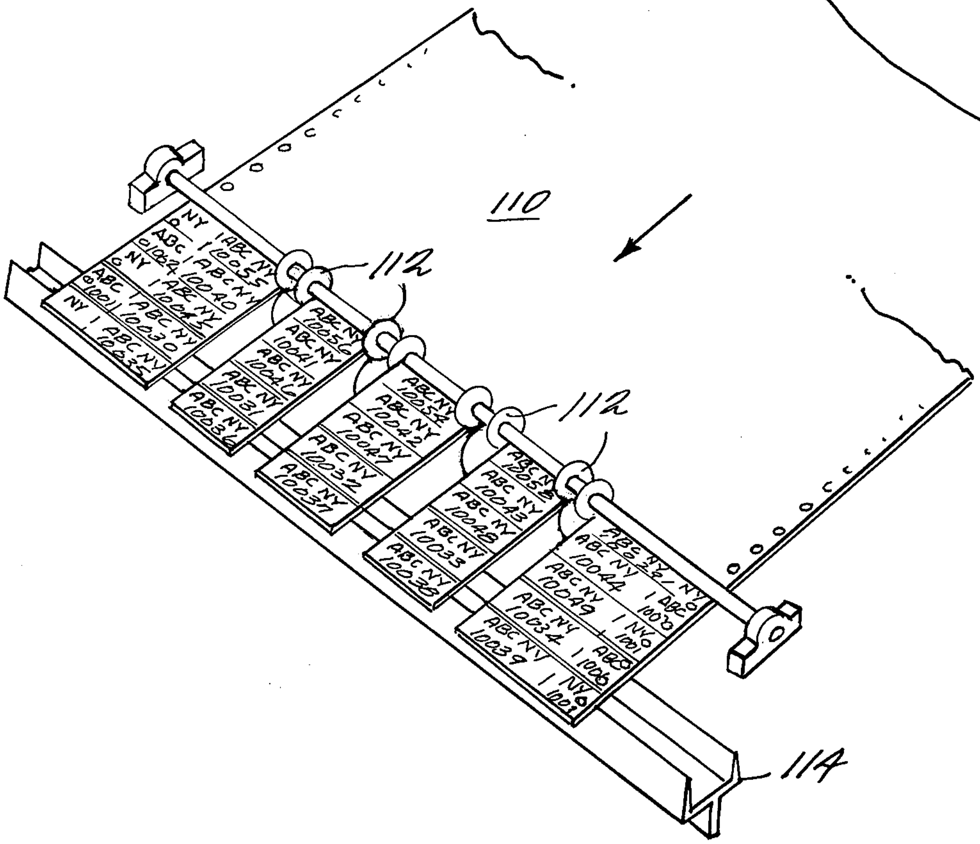
FIG. 6b is a schematic perspective view of a sheet of tax stamps being advanced and cut by another apparatus useable for practicing the present invention.

FIGS. 3–5 depict detailed representations of cutting wheel 26 and vacuum wheel 28. As shown in FIGS. 3 and 4, cutting wheel 26 generally comprises a shaft 50 which can be rotated in a predetermined direction by any conventional power means (not shown). The cutting wheel 26 defines a cylindrical portion 52 which is concentrically disposed relative shaft 50. A cutting blade 54 is provided to longitudinally separate the two rows of tax stamps. It should be noted that the two rows have been previously separated from the sheet of tax stamps via cutting bar 24 (see, FIG. 1). As cutting wheel 26 rotates, transverse cutting members 56 will bear against each of the two rows to separate each of the tax stamp units. As will be noted by referring to FIG. 3, longitudinal cutting blade 54 is eccentrically disposed relative to shaft 50. In such a manner, the rotation of cutting wheel 26 will compensate for the added dimension of portion 30 on each of the end tax stamp units. It should also be pointed out that transverse cutting blades 56 are disposed in equal dimension relative to adjacent ones so that the four transverse cuts necessary to separate the five columns of tax stamp units will be effected. Of course, the cutting wheel 26 is rotated at a predetermined speed so as to effect precise cutting of the tax stamps at predetermined locations.

Generally, each tax stamp unit is substantially equal to the longitudinal length of the bottom of the cigarette packs 16 to which they will be secured. Of course, as noted above, each end tax stamp unit will include a portion 30 which is placed on the end ones of cigarette packs 16 so as to extend beyond the peripheral edge 32 of carton 10. The dimensioning of portion 30 in the longitudinal direction can be varied, the only requirement being that it extends a sufficient length beyond the peripheral edge 32 of carton 10 so that when brought into a contacting relationship with side 40 of carton 10, it will be readily visible.

The vacuum transfer wheel 28 of apparatus 14 is generally circular in shape and defines a plurality of apertures 60 in fluid communication with hollow shaft 62. Hollow shaft 62 is connected to a conventional vacuum source (not shown) so that when each individual tax stamp unit 64 contacts wheel 28, the vacuum produced thereby will cause units 64 to be picked up and temporarily held onto wheel 28 as it rotates. The radial displacement of apertures 60 is selected so that it forms two rows along the peripheral edge of wheel 28 corresponding to the two rows of separated tax stamp units 64. Additionally, the spatial relationship of apertures 60 with respect to adjacent ones is, of course, dependent upon the speed of rotation of wheel 28 so that each tax stamp unit will be picked up without destroying the spatial integrity of the tax stamp units relative to one another. The vacuum is controlled by any suitable means, e.g., by a plug or shield on the interior of wheel 28, cooperating with apertures 60 so that when the tax stamps are brought into contacting relationship with the bottoms of the cigarette packs 16, the vacuum will be terminated and the individual tax stamp units will therefore be placed onto the bottom of cigarette packs 16. The speed of rotation of wheel 28 and cutting wheel 26 together with the speed of conveyance of cartons 10 in the direction 12 is synchronously selected so that a continuous process can be effected. Such control can be provided by any state of the art electronic sensing and controlling apparatus which are in and of themselves well known to those in the art.

An alternative apparatus for practicing the present invention is depicted schematically in FIGS. *6a–6c*. As shown in FIG. *6a*, cigarette cartons 10 are conveyed in a path (arrow 102) so that a plow 104 can penetrate below bottom flaps 18, 20. In such a manner, the spot gluing of flaps 18, 20 will be broken so as to expose the bottoms of the individual cigarette packs 10. The plow 104 depicted in FIG. *6a* is similarily applicable for use with the apparatus depicted in FIGS. 1–2 as described in detail above.

Syncronously with the conveyance of cartons 10, a sheet 110 of paper having computer printed tax indicia thereon is forwardly conveyed by suitable means (not shown). Cutting wheels 112 spaced a predetermined dimension from one another effect transverse cuts in sheet 110 so as to separate the sheet into five columns. Thereafter, a longitudinal cutting blade 114 effects two longitudinal cuts in the paper 110 thereby separating the sheet into ten discrete units having two rows of five units each.

After complete separation of the sheet 110 into discrete units, a transfer mechanism 115 (see FIG. *6c*) transfers the units en masse to the bottoms of the cigarette packs 16 housed in carton 10. A vacuum head 117 connected to a vacuum source 118 is operable between a pick-up position (noted in solid line) and a discharge position (noted in phantom line) by a conventional linkage system 119 connected to a suitable cam means 121 by a cam follower 123.

The end units 30 of the tax stamps are placed so that the validator portion 33 extends beyond the peripheral edge 32 of carton 10 (see FIG. *7a*). Thereafter, the end units 30 are adhesively secured to the exterior of end 40 (FIG. *7b*) and flaps 18, 20 can be re-glued and folded according to conventional techniques.

Of course the description above with regard to end 40 is similarly applicable to the opposite end thereof. Since other apparatus may be conceived by those in the paper transfer art for practicing the present invention, the description contained herein to the alternative preferred apparatuses described above should not be construed as limiting thereto.

Thus, according to the present invention the individual tax stamps will be securely adhered via the heat-sensitive adhesive to each bottom of cigarette packs 16. As can be seen by referring to FIG. 8, the present invention provides for portion 30 to extend beyond the peripheral edge 32 of carton 10 so as to be secured against the exterior sides 40 of carton 10. When flaps 20, 18 are subsequently closed as hereinbefore described, portions 30 secured to sides 40 of carton 10 will be clearly visible. As noted above, portions 30 may have tax indicia printed thereon with proprietary inks which change colors when touched with specific chemicals. Therefore, an inspector may readily determine whether the carton contains properly taxed cigarette packs and whether the tax stamps are genuine without physically opening carton 10. The method of the present invention allows portions 30 to extend at least to the peripheral edge of carton 10 without being extended thereover and secured to the side of carton 10. Thus, by squeezing slightly on the broad sides of carton 10, an inspector can readily view the tax stamps. It is believed that no other method can uniformly and regularly place the tax stamp in such a position so that it can be seen at the edge of the carton and that a non-destructive validity test can be performed. Of course, it is preferred from an inspection point of view to have portions 30 extend down the sides of carton 10, but this feature is not necessary. This factor will be a great deterrent to smuggling and counterfeiting of tax stamps.

Thus, according to the present invention a novel and accurate method is disclosed wherein an inspector can, at a quick visual glance, determine whether a carton of cigarettes contains properly taxed packs of cigarettes and provides for a unique "audit trail" heretofore unavailable to the taxing authorities. According to the present invention, this novel advantage is accomplished by providing a portion which extends beyond each end of the cigarette carton so that when brought into a contacting relationship with the end of the cigarette carton, the portion will be visually noticeable after the bottom flaps of the cigarette carton are closed.

The present invention also provides a complete audit trail in those instances in which the packs are taken out of the cartons and sold individually.

While reference has been made to "heat-sensitive" adhesives for securely affixing the tax stamps to cigarette packs, it should be understood that such reference is merely what is presently considered the preferred embodiment thereof. Thus, other adhesives such as liquid adhesives can advantageously be utilized. Additionally, the tax stamps can be affixed to cigarette packs utilizing a transparent plastic sheet which is heat fused or laminated onto the cigarette packs according to known techniques.

While the present invention has been herein described in what is presently conceived to be the most preferred and exemplary embodiment thereof, those in the art will appreciate that many modifications may be made hereof, which modifications shall be accorded the broadest interpretation of the appended claims so as to encompass all equivalent methods, and/or purposes.

What is claimed is:

1. A method of stamping, for taxing purposes, individual cigarette packs in a carton of cigarettes wherein said carton includes a container having bottom flaps so as to close a bottom side of said container in a longitudinal direction and at least ten cigarette packs housed in said container in two longitudinal groupings of five packs each, said method comprising steps of:

(a) selecting a sheet having at least two rows and five columns, said rows and columns thereby defining discrete labels each bearing tax indicia, opposing end labels of said rows including a distal portion extending in the longitudinal direction a predetermined dimension;

(b) separating each of said labels while simultanesouly maintaining spatial integrity of said columns and rows;

(c) transferring said labels separated according to step (b) onto said cigarette packs so that said portions extend beyond opposing peripheral edges, respectively, of said container, said labels corresponding to said longitudinal grouping of five packs each;

(d) affixing said labels to said packs thereby establishing that said packs have been taxed by proper taxing authority; and (e) securing said portions to exterior sides of said container.

2. A method as in claim 1 wherein prior to step (a), there is practiced the step of printing unique indicia on a sheet of paper wherein said indicia comprises sequential numerals, cigarette wholesaler codes, or wholesaler name so as to provide a means of establishing an audit trail.

3. A method as in claim 2 wherein said printing step is practiced utilizing ink which changes to a predetermined color when contacted with a predetermined chemical.

4. A method as in claim 2 wherein the sheet includes an uncoated side an a coated side, said indicia being applied to said uncoated side.

5. A method as in claim 4 comprising prior to step (c) the steps of:

(i) supplying a carton having said bottom flaps closed; and (ii) opening said bottom flaps thereby exposing the bottom of said cigarette packs housed therein.

6. A method as in claim 5 comprising after step (d) the step of:

(f) closing said bottom flap thereby enclosing therein said packs having said labels affixed thereto according to step (d).

7. A method as in claim 6 wherein steps (b) through (f) and steps (i)–(ii) are repeated until a predetermined number of cartons have been labeled.

8. A method as in claim 7 wherein the side of said sheet opposite said indicia bearing side is coated with a heat-sensitive adhesive.

9. A method as in claim 8 wherein step (d) is practiced by applying heat to said labels so as to effect bonding of said heat-sensitive adhesive to said cigarette packs.

10. A method as in claim 1 wherein said portions include on the side in contact with said exterior sides a heat-sensitive adhesive.

11. A method as in claim 10 wherein step (e) is practiced by the steps of:

(1) folding said portions to effect contacting relationship thereof with the sides of said carton; and (2) applying heat to said portions to effect bonding between said adhesive and said sides of said carton.

* * * * *